(12) United States Patent
Jensen et al.

(10) Patent No.: US 12,316,264 B2
(45) Date of Patent: May 27, 2025

(54) TORQUE RIPPLE MITIGATION

(71) Applicant: GM GLOBAL TECHNOLOGY OPERATIONS LLC, Detroit, MI (US)

(72) Inventors: William Robert Jensen, Walled Lake, MI (US); Mazharul Chowdhury, Canton, MI (US); Suresh Gopalakrishnan, Troy, MI (US); Lei Hao, Troy, MI (US); Peng Peng, Columbus, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 18/313,616

(22) Filed: May 8, 2023

(65) Prior Publication Data

US 2024/0380342 A1     Nov. 14, 2024

(51) Int. Cl.
*H02P 8/36* (2006.01)
*H02P 6/10* (2006.01)

(52) U.S. Cl.
CPC ..................... *H02P 6/10* (2013.01)

(58) Field of Classification Search
CPC ..................... H02P 6/10; H02P 29/50
See application file for complete search history.

(56) References Cited

U.S. PATENT DOCUMENTS 8,786,244 B2 *   7/2014   Jang .................. H02P 23/14
                                                            318/473
2017/0219094 A1 * 8/2017   Jammulamadaka .. F16H 61/143

\* cited by examiner

*Primary Examiner* — Muhammad S Islam
(74) *Attorney, Agent, or Firm* — CANTOR COLBURN LLP (57) ABSTRACT

Techniques are provided for torque ripple mitigation. In one embodiment, the techniques involve determining a first torque ripple at a torque output of a target electrical machine, upon determining that the first torque ripple exceeds a threshold, reproducing the torque output based on a pair of gamma control sets, determining a second torque ripple at the reproduced torque output, upon determining that the second torque ripple falls below the threshold, generating qualified gamma controls based on the gamma control sets, and supplying the qualified gamma controls to the target electrical machine.

20 Claims, 4 Drawing Sheets

TORQUE RIPPLE MITIGATION

INTRODUCTION

The subject disclosure relates to torque ripple, and more specifically, to reducing torque ripple via dual gamma control.

Torque ripple refers to fluctuations in the torque produced by a rotational output of an electric motor or generator. Processes for mitigating torque ripple involve optimizing motor design and construction. After production, torque ripple mitigation systems can inject counter harmonics into the current supplied to a motor to suppress torque ripple harmonics. However, the torque ripple mitigation systems lack the bandwidth and ability to suppress higher order harmonics. These higher order harmonics can cause unwanted noise and vibrations, as well as degraded performance, of the motor.

SUMMARY

In one exemplary embodiment, a method is provided to mitigate torque ripple of an electrical machine. The method includes determining a first torque ripple at a torque output of a target electrical machine, upon determining that the first torque ripple exceeds a threshold, reproducing the torque output based on a pair of gamma control sets, determining a second torque ripple at the reproduced torque output, upon determining that the second torque ripple falls below the threshold, generating qualified gamma controls based on the gamma control sets, and supplying the qualified gamma controls to the target electrical machine.

In addition to one or more of the features described herein, the method also includes calibrating the qualified gamma controls based on an operating parameter, the operating parameter includes a minimum value, a target value, or a maximum value of a magnetic flux linkage, an angular speed, a voltage usage, or a current usage.

In addition to one or more of the features described herein, the threshold represents a peak-to-peak torque ripple target value that is determined based on safety or performance requirements of the target electrical machine.

In addition to one or more of the features described herein, the pair of gamma control sets includes a first set of gamma controls and a second set of gamma controls that each represents a three-phase power signal.

In addition to one or more of the features described herein, the first set of gamma controls and the second set of gamma controls each includes three gamma controls, each of the three gamma controls represents a current and control angle at a fundamental frequency of the target electrical machine.

In addition to one or more of the features described herein, the qualified gamma controls represent a given pair of gamma controls sets that reproduce the torque output, while reducing a torque ripple at the torque output.

In addition to one or more of the features described herein, supplying the qualified gamma controls to the target electrical machine includes configuring a controller to identify a combination of the qualified gamma controls, and supply the combination to designated input stator windings of the target electrical machine.

In another exemplary embodiment, a system is provided to mitigate torque ripple of an electrical machine. The system includes a processor, and memory or storage comprising an algorithm or computer instructions, which when executed by the processor, performs an operation that includes determining a first torque ripple at a torque output of a target electrical machine, upon determining that the first torque ripple exceeds a threshold, reproducing the torque output based on a pair of gamma control sets, determining a second torque ripple at the reproduced torque output, upon determining that the second torque ripple falls below the threshold, generating qualified gamma controls based on the gamma control sets, and supplying the qualified gamma controls to the target electrical machine.

In addition to one or more of the features described herein, the operation also includes calibrating the qualified gamma controls based on an operating parameter, the operating parameter includes a minimum value, a target value, or a maximum value of a magnetic flux linkage, an angular speed, a voltage usage, or a current usage.

In addition to one or more of the features described herein, the threshold represents a peak-to-peak torque ripple target value that is determined based on safety or performance requirements of the target electrical machine.

In addition to one or more of the features described herein, the pair of gamma control sets includes a first set of gamma controls and a second set of gamma controls that each represents a three-phase power signal.

In addition to one or more of the features described herein, the first set of gamma controls and the second set of gamma controls each includes three gamma controls, each of the three gamma controls represents a current and control angle at a fundamental frequency of the target electrical machine.

In addition to one or more of the features described herein, the qualified gamma controls represent a given pair of gamma controls sets that reproduce the torque output, while reducing a torque ripple at the torque output.

In addition to one or more of the features described herein, supplying the qualified gamma controls to the target electrical machine includes configuring a controller to identify a combination of the qualified gamma controls, and supply the combination to designated input stator windings of the target electrical machine.

In yet another exemplary embodiment a computer-readable storage medium having a computer-readable program code embodied therewith is provided to mitigate torque ripple of an electrical machine. The computer-readable program code is executable by one or more computer processors to perform an operation that includes determining a first torque ripple at a torque output of a target electrical machine, upon determining that the first torque ripple exceeds a threshold, reproducing the torque output based on a pair of gamma control sets, determining a second torque ripple at the reproduced torque output, upon determining that the second torque ripple falls below the threshold, generating qualified gamma controls based on the gamma control sets, and supplying the qualified gamma controls to the target electrical machine.

In addition to one or more of the features described herein, the operation also includes calibrating the qualified gamma controls based on an operating parameter, the operating parameter includes a minimum value, a target value, or a maximum value of a magnetic flux linkage, an angular speed, a voltage usage, or a current usage.

In addition to one or more of the features described herein, the threshold represents a peak-to-peak torque ripple target value that is determined based on safety or performance requirements of the target electrical machine.

In addition to one or more of the features described herein, the pair of gamma control sets includes a first set of gamma controls and a second set of gamma controls that each represents a three-phase power signal, the first set of gamma controls and the second set of gamma controls each includes three gamma controls, and each of the three gamma controls represents a current and control angle at a fundamental frequency of the target electrical machine.

In addition to one or more of the features described herein, the qualified gamma controls represent a given pair of gamma controls sets that reproduce the torque output, while reducing a torque ripple at the torque output.

In addition to one or more of the features described herein, supplying the qualified gamma controls to the target electrical machine includes configuring a controller to identify a combination of the qualified gamma controls, and supply the combination to designated input stator windings of the target electrical machine.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to one or more algorithms, instruction sets, software applications, or other computer-readable program code that can be executed by a processor to perform the functions, operations, or processes described herein.

Embodiments of the present disclosure improve upon torque ripple mitigation systems by enabling dual gamma controls in post-production machines. In one embodiment, inverters supply different gamma controls to separate windings of an electrical machine. The gamma controls are swept across a range of current magnitudes (amps), and a range of control angles, to identify control combinations that maintain the torque output of the electrical machine, while minimizing the torque ripple. Further, the control combinations can be refined to adhere to at least one operating parameter. The control combinations can be programmed into a controller to optimize operation of the electrical machine.

One benefit of the disclosed embodiments is to improve the torque quality of the electrical machine, without compromising the average torque output. Further, embodiments of the present disclosure can mitigate higher order harmonics without higher order harmonic injection, thereby improving the performance, and noise, vibrations, and harshness (NVH) metrics of the electrical machine.

Figure 1:
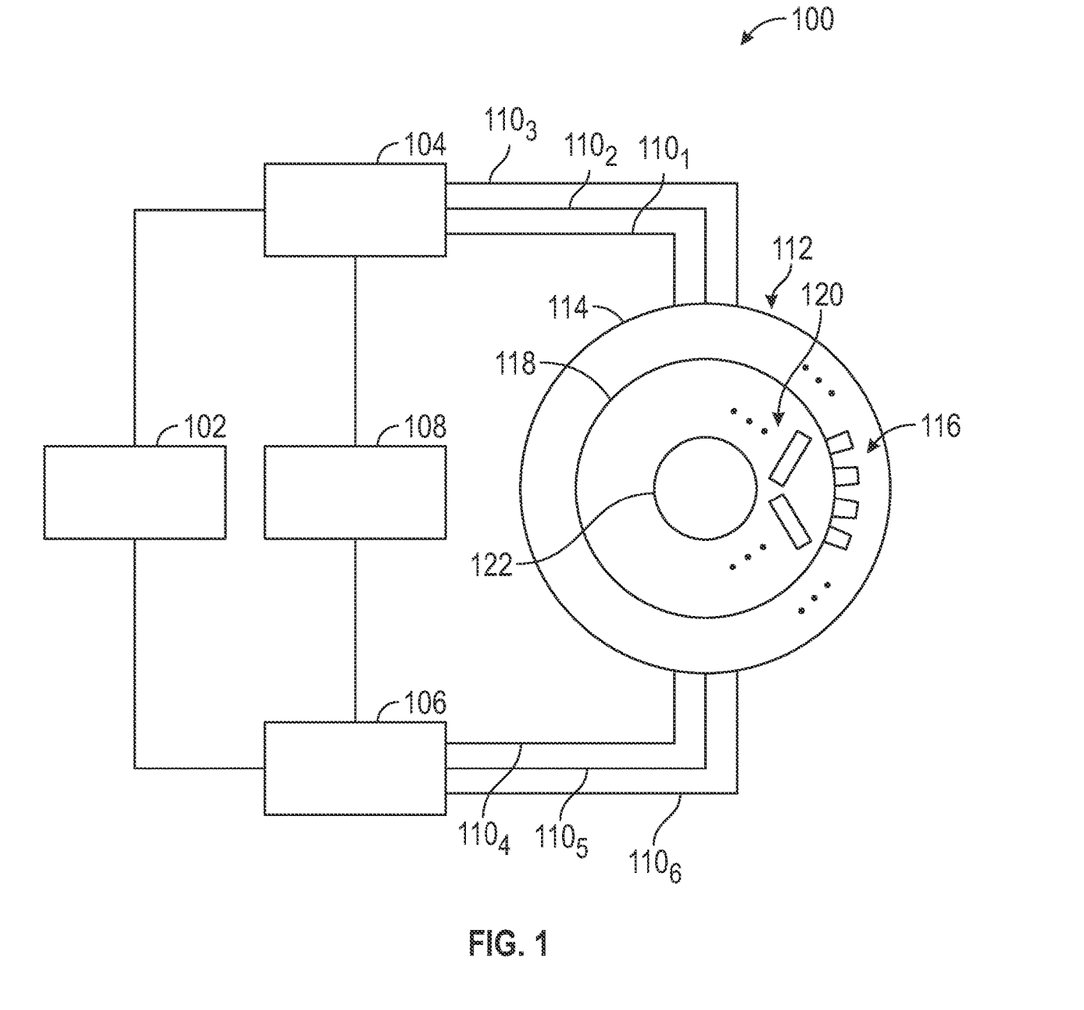
FIG. 1 illustrates a torque ripple control environment, according to one embodiment.

FIG. 1 illustrates a torque ripple control environment 100, according to one embodiment. The torque ripple control environment 100 can include any combination of physical or simulated elements. Further, the torque ripple control environment 100 can include multiple gamma controls.

In the illustrated embodiment, the torque ripple control environment 100 includes a power source 102, a first inverter 104, a second inverter 106, a controller 108, a first set of gamma controls $110_{1-3}$, a second set of gamma controls $110_{4-6}$, and an electrical machine 112. The power source 102 is electrically coupled to the first inverter 104 and the second inverter 106, such that the power source 102 can supply the first inverter 104 and the second inverter 106 with direct current (DC) power.

The first inverter 104 and the second inverter 106 can convert the DC power received from the power source 102 to an alternating current (AC) power supplied to the electrical machine 112. In one embodiment, the first inverter 104 and the second inverter 106 may have integrated controllers, or may be coupled to an external controller, to perform pulse width modulation (PWM) techniques that generate the AC power output. In the illustrated embodiment, the first inverter 104 and the second inverter 106 are coupled to external controller 108.

The controller 108 can represent an application specific integrated circuit (ASIC), an electronic circuit, a processor (shared, dedicated, or group) and memory, or any other computing system, that executes one or more software or firmware programs, a combinational logic circuit, and/or other suitable components that provide the functionality described herein. In one embodiment, the controller 108 can control PWM techniques of the first inverter 104 to generate the first set of gamma controls $110_{1-3}$, and can control PWM techniques of the second inverter 106 to generate the second set of gamma controls $110_{4-6}$.

Each of the gamma controls $110_{1-6}$ can be represented as a phasor at a fundamental frequency: $I\angle(\gamma\pm\Theta)$ at $f_0$, where I represents a current (amps), $\gamma$ represents a gamma angle (degrees), $\Theta$ represents an offset angle (degrees), $\gamma\pm\Theta$ represents a control angle (degrees), and $f_0$ represents a fundamental frequency (Hz) of the electrical machine 112. In one embodiment, the first set of gamma controls $110_{1-3}$ and the second set of gamma controls $110_{4-6}$ each includes $\Theta$ values of 0, +120, and −120. Hence, the first set of gamma controls $110_{1-3}$ and the second set of gamma controls $110_{4-6}$ represent a three-phase power signals supplied to the electrical machine 112.

The electrical machine 112 can represent an alternating current (AC) motors and generators, such as a synchronous motor, an induction motor, a synchronous generator, or the like. In the illustrated embodiment, the electrical machine 112 is a permanent magnet motor. The electrical machine 112 includes a stator core 114 with slots 116 that house stator windings (not shown), a rotor core 118 with permanent magnets 120, and a rotor output unit 122. As indicated in the illustrated embodiment, the slots 116 and stator windings are placed throughout the stator core 114, and the permanent magnets 120 are placed throughout the rotor core 118. In one embodiment, the number of slots 116 and stator windings determines the harmonic order of the electrical machine 112.

The AC power signals (i.e., the first set of gamma controls $110_{1-3}$ and the second set of gamma controls $110_{4-6}$) supplied to the electrical machine 112 are electrically coupled to designated input windings (not shown) of the stator core 114. The AC power signals generate magnetic fields in the stator core 114, which interact with magnetic fields generated by the magnetic poles of the permanent magnets 120 to cause the rotor core 118 to rotate. The arrangement of the permanent magnets 120 in the rotor core 118 determines how many magnetic poles exist in the electrical machine 112. For example, the two permanent magnets 120 shown in FIG. 1 may indicate 1 or 2 magnetic poles.

The rotor output unit 122 is coupled to the rotor core 118, and rotates in sync with the rotor core 118. The rotor output unit 122 may be directly coupled to an output shaft, or indirectly coupled to the output shaft (via gearboxes, pulley systems, flywheels, or the like), to transfer torque produced by the electrical machine 112 to another destination.

In one embodiment, the construction and design of the electrical machine 112 can cause magnetic field variations that result in torque ripple produced when the electrical machine 112 generates a torque output. For example, the permanent magnets 120 may cause variations in the magnetic fields in the rotor core 118, or the stator windings of the stator core 114 may be distributed unevenly or non-uniform, which can cause variations in the magnetic fields of the stator core 114. Torque ripple may also be caused by a reaction of the electrical machine 112 to excitation from the AC power signals, mechanical vibrations due to unbalanced loads or worn parts, or the like.

In one embodiment, the controller 108 includes torque ripple mitigation features that mitigate torque ripple of the electrical machine 112. The controller 108 is discussed in greater detail in FIG. 2.

The torque ripple mitigation features can determine gamma controls $110_{1-6}$ that suppress torque ripples of the electrical machine 112. This process is described in greater detail in FIG. 3.

The torque ripple mitigation features can also determine optimal gamma controls for given operating parameters. This process is described in greater detail in FIG. 4.

Figure 2:
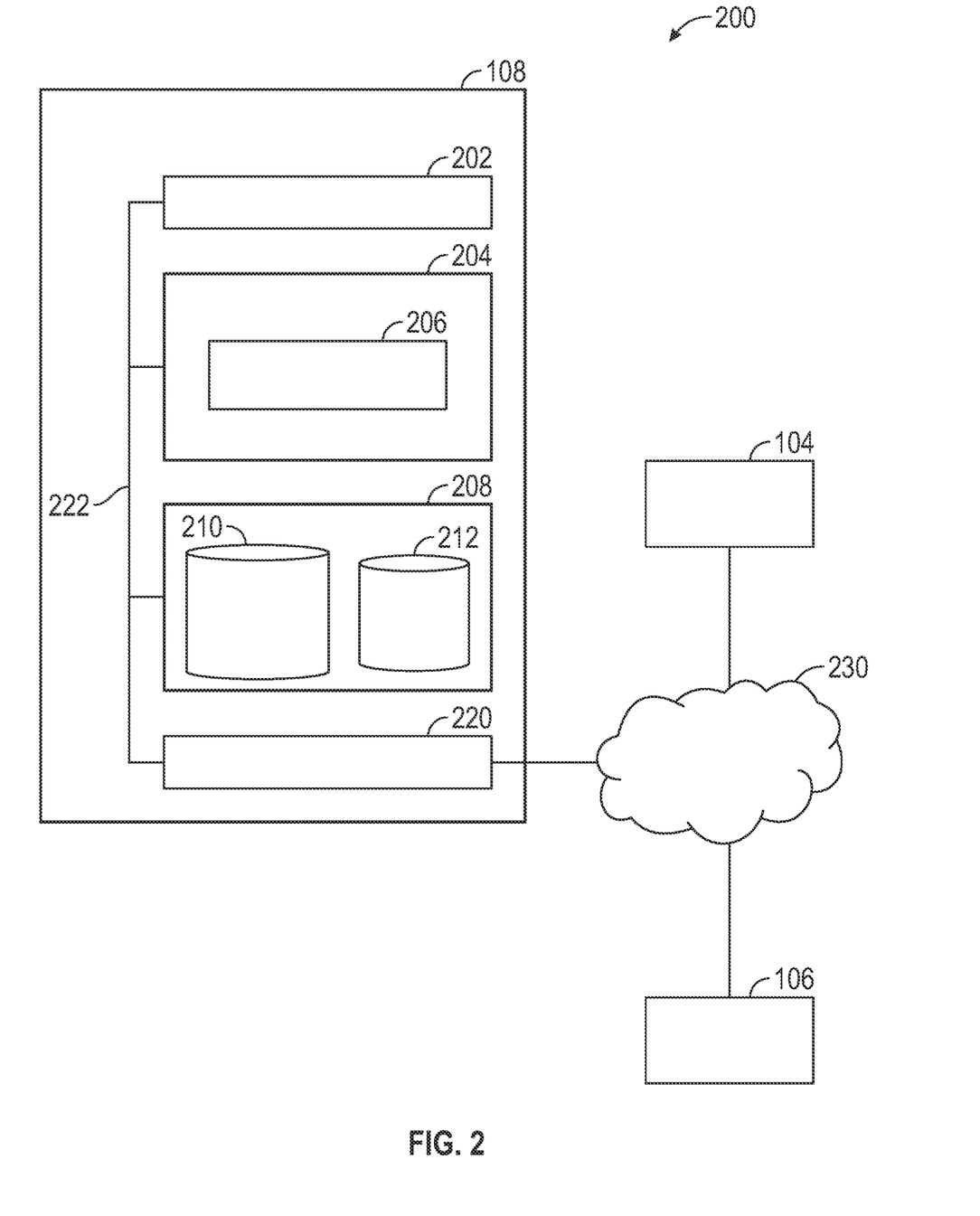
FIG. 2 illustrates a computing environment, according to one embodiment.

FIG. 2 illustrates a computing environment 200, according to one embodiment. In the illustrated embodiment, the computing environment 200 includes a controller 108, network 230, a first inverter 104, and a second inverter 106.

In one embodiment, the controller 108 includes a processor 202 that obtains instructions and data via a bus 222 from a memory 204 or storage 208. Not all components of the controller 108 are shown. The controller 108 is generally under the control of an operating system (OS) suitable to perform or support the functions or processes disclosed herein. The processor 202 is a programmable logic device that performs instruction, logic, and mathematical processing, and may be representative of one or more CPUs. The processor may execute one or more algorithms, instruction sets, or applications in the memory 204 or storage 208 to perform the functions or processes described herein.

The memory 204 and storage 208 can be representative of hard-disk drives, solid state drives, flash memory devices, optical media, and the like. The storage 208 can also include structured storage (e.g., a database). In addition, the memory 204 and storage 208 may be considered to include memory physically located elsewhere. For example, the memory 204 and storage 208 may be physically located on another computer communicatively coupled to the controller 108 via the bus 222 or the network 230.

The controller 108 can be connected to other computers (e.g., controllers, distributed databases, servers, or webhosts), the first inverter 104, or the second inverter 106 via a network interface 220 and the network 230. The network 230 can comprise, for example, a local area network, a wide area network, or a wireless network. In one embodiment, the network includes a controller area network (CAN) or transmission control protocol (TCP) bus. The network 230 can also include any combination of physical transmission cables, optical transmission fibers, wireless transmission, routers, firewalls, switches, gateway computers or edge servers. The network interface 220 may be any type of network communications device allowing the controller 108 to communicate with computers and other components of the computing environment 200 via the network 230.

In the illustrated embodiment, the memory 204 includes a gamma control module 206. In one embodiment, the gamma control module 206 represents one or more algorithms, instruction sets, software applications, or other computer-readable program code that can be executed by the processor 202 to perform the functions, operations, or processes described herein.

In one embodiment, the gamma control module 206 generates a qualified data set 210 of qualified gamma controls to control a torque ripple of the electrical machine 112. The qualified gamma controls can include the aforementioned gamma controls $110_{1-6}$ that provide optimal performance of the electrical machine across multiple operating parameters. Operation of the gamma control module 206 is described in further detail in FIGS. 3-4 herein.

Figure 3:
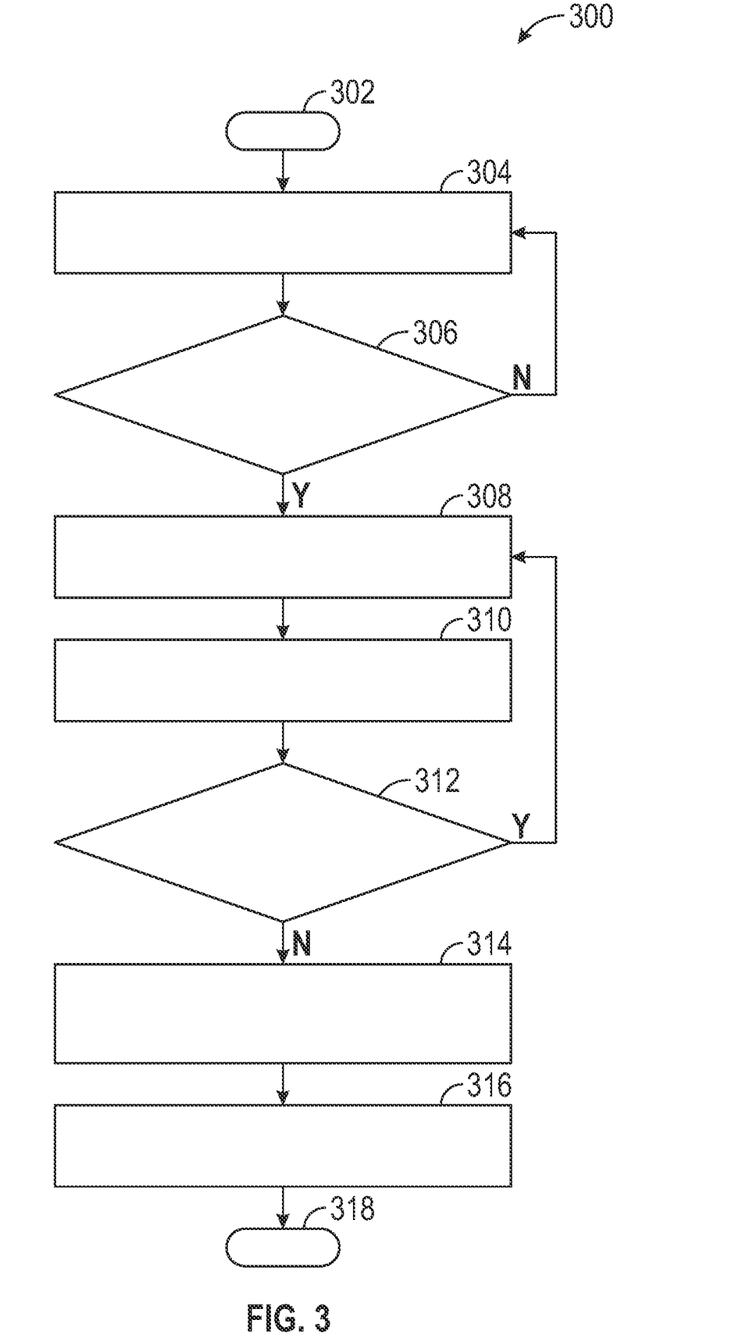
FIG. 3 illustrates a flowchart of a method of generating a set of gamma controls, according to one embodiment.

FIG. 3 illustrates a flowchart of a method 300 of generating a set of gamma controls, according to one embodiment. The method 300 begins at block 302.

At block 304, the gamma control module 206 determines a first torque ripple at a torque output. In one embodiment, a torque ripple profile can be determined for a range of torque outputs of the electrical machine 112. For example, a range of torque ripples may be measured for corresponding torque outputs ranging from −400 Nm to +400 Nm. The first torque ripple can be represented as a peak-to-peak torque ripple value for a given torque output of the range of torque outputs.

When the torque ripple control environment 100 is a simulated environment, the gamma control module 206 can determine the range of torque ripples via a finite element analysis (FEA). In one embodiment, FEA is a computer simulation technique that can estimate or predict torque ripples of the electrical machine 112. FEA techniques can involve discretizing the electrical machine 112 into finite elements that are assigned material properties and behavioral conditions of the electrical machine 112. The finite elements are used to model interactions between internal electromagnetic and mechanical forces, and determine to features (e.g., torque output and torque ripple) of the electrical machine 112.

When the torque ripple control environment 100 is a physical environment, the gamma control module 206 can determine the range of torque ripples by powering the electrical machine 112 with an input torque command, and then determining the torque ripple from dynamometer measurements at the torque output of the electrical machine 112. The torque ripple may also be determined by using oscilloscopes to measure electrical signals produced by the electrical machine 112 when generating torque output. The electrical signals can be analyzed to determine the torque ripple. The torque ripple may also be determined by using strain gauges or laser displacement sensors to measure mechanical strain or displacement of an output shaft of the electrical machine 112. The measurements can be used to determine the torque ripple.

At block 306, the gamma control module 206 determines whether the first torque ripple exceeds a threshold. In one embodiment, the threshold represents a peak-to-peak torque ripple target value that is determined based on safety or performance requirements of the electrical machine 112.

Upon determining that the first torque ripple does not exceed the threshold, the method 300 proceeds to block 304, where it determines another torque ripple at another torque output. However, upon determining that the first toque ripple exceeds the threshold, the method 300 proceeds to block 308.

At block 308, the gamma control module 206 reproduces the torque output based on a pair of gamma control sets. In one embodiment, the pair of gamma control sets includes the first set of gamma controls $110_{1-3}$ and the second set of gamma controls $110_{4-6}$. As described above, each of the first set of gamma controls $110_{1-3}$ and the second set of gamma controls $110_{4-6}$ can include three gamma controls. Each of the gamma controls includes a current magnitude and control angle.

In one embodiment, the gamma control module 206 performs an FEA to simulate torque outputs for a range of current magnitudes and control angles of the first set of gamma controls $110_{1-3}$ and the second set of gamma controls $110_{4-6}$. Different combinations of gamma controls $110_{1-6}$ may be evaluated to determine which combinations can reproduce the torque output determined at block 304. In another embodiment, the gamma control module 206 varies the gamma controls $110_{1-6}$ supplied to the electrical machine 112, and the torque output and torque ripple are measured at the electrical machine 112 to determine which combinations of gamma controls $110_{1-6}$ can reproduce the torque output determined at block 304.

At block 310, the gamma control module 206 determines a second torque ripple at the reproduced torque output. The second torque ripple can be determined via a process similar to the process used to determine the first torque ripple at block 304.

At block 312, the gamma control module 206 determines whether the second torque ripple exceeds the threshold. Upon determining that the second torque ripple exceeds the threshold, the method 300 proceeds to block 308, where it performs as described above. However, upon determining that the second torque ripple does not exceed the threshold, the method 300 proceeds to block 314.

At block 314, the gamma control module 206 generates qualified gamma controls (QGCs) based on the pair of gamma control sets. In one embodiment, a QGC represents a pair of gamma controls sets that can reproduce and maintain the torque output, while reducing the torque ripple at the torque output. The gamma control module 206 can apply Clarke and Park transformations to the gamma control sets to convert the gamma control sets to direct-quadrature (d-q) axis representations. In this manner, a gamma control set (which includes three of the gamma controls $110_{1-6}$) can be represented by one d-axis current and one q-axis current, in lieu of being represented by three phasors. Therefore, a QGC (which includes a pair of gamma control sets) can be represented as a pair of d-axis currents and q-axis currents (e.g., $[I_{d1}, I_{q1}]$ and $[I_{d2}, I_{q2}]$).

In one embodiment, the gamma control module 206 adds the QGCs to the qualified data set 210. The method 300 may be repeated for all torque outputs in a given range of torque outputs.

At block 316, the gamma control module 206 supplies the QGCs to a target electrical machine. In one embodiment, the gamma control module 206 supplies the QGCs to designated input stator windings of a target electrical machine that reflects the design and performance of the electrical machine 112. In another embodiment, the gamma control module 206 configures a controller to supply the QGCs to the target electrical machine. Hence, the target electrical machine can run at a given torque output, while minimizing torque ripple. The method 300 ends at block 318.

Figure 4:
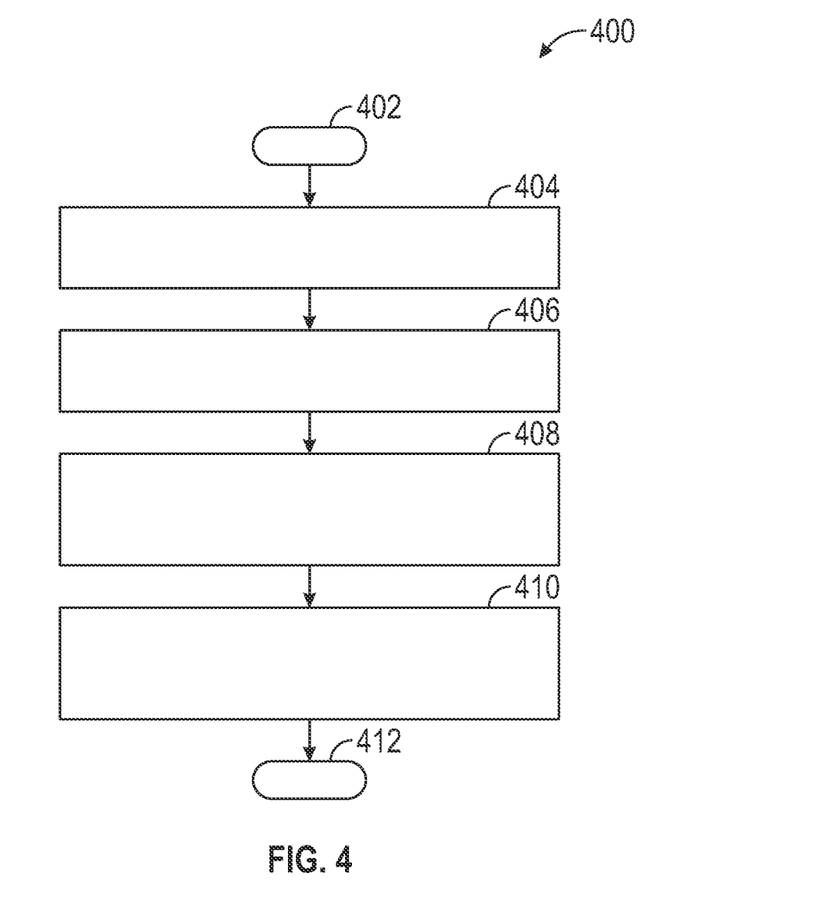
FIG. 4 illustrates a flowchart of a method of determining optimal gamma controls for given operating parameters, according to one embodiment.

FIG. 4 illustrates a flowchart of a method 400 of determining optimal gamma controls for given operating parameters, according to one embodiment. The method 400 begins at block 402.

At block 404, the gamma control module 206 receives a qualified data set 210 comprising QGCs. As previously discussed, in one embodiment, a QGC can be represented as a pair of d-axis currents and q-axis currents (e.g., $[I_{d1}, I_{q1}]$ and $[I_{d2}, I_{q2}]$) that can be supplied to designated input stator windings of the electrical machine 112 to reproduce and maintain a given torque output, while reducing the torque ripple that existed at the torque output prior to the torque reproduction via the QGCs.

At block 406, the gamma control module 206 calibrates the QGCs based on an operating parameter. The QGCs can be calibrated based on multiple, concurrent operating parameters. In one embodiment, the operating parameter can represent a minimum value, target value, or maximum value of an operating point of the electrical machine 112. Examples of the operating parameter include a magnetic flux linkage, a torque, an angular speed, a torque ripple, a voltage usage, a current usage, or the like. The operating parameters may be set based on safety or performance requirements of the electrical machine 112

When the torque ripple control environment 100 is a simulated environment, the gamma control module 206 can calibrate the QGCs via FEA techniques that simulate all combinations of the QGCs to determine which combinations adhere to the set operating parameters. For example, for a given torque output target, the gamma control module 206 may determine which combination of gamma controls can reproduce the torque output target, and minimize the torque ripple at the torque output target, minimize current usage at the torque output target, refrain from exceeding a voltage usage limit at the torque target, or the like.

When the torque ripple control environment 100 is a physical environment, the gamma control module 206 can calibrate the QGCs by powering the electrical machine 112 with an input torque command, and then determining adherence to the operating parameters via measurements of the electrical machine 112 via a dynamometer, an oscilloscope, a strain gauge, a laser displacement sensor, or the like.

At block 408, the gamma control module 206 generates a lookup table (LUT) based on the calibrated QGCs and the operating parameter. In one embodiment, the LUT includes mappings of combinations of the calibrated QGCs to adherence of the operating parameters at given torque outputs. In the embodiment illustrated in FIG. 2, the LUT is represented as a control LUT 212.

At block 410, the gamma control module 206 supplies the calibrated QGCs to a target electrical machine based on the LUT. In one embodiment, the gamma control module 206 identifies a combination of calibrated QGCs from the LUT that satisfies torque output and operating parameter requirements, and supplies the calibrated QGCs to designated input stator windings of a target electrical machine that reflects the design of the electrical machine 112.

In another embodiment, the gamma control module 206 configures a controller to identify the combination of calibrated QGCs from the LUT, and supply the calibrated QGCs to designated input stator windings of the target electrical machine. For example, a vehicle manufacturer may have operating parameter requirements for a post-production motor that is similar to the electrical machine 112. Hence, the gamma control module 206 may search the LUT to determine which combination of calibrated QGCs can provide a required torque output, while also adhering to the operating parameters requirements. The gamma control module 206 can then program the controller to supply the combination of calibrated QGCs identified from the LUT to power the motor. In this manner, the motor can run at a target torque output and meet operating parameters, while minimizing the torque ripple of the motor. The method 400 ends at block 412.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method comprising:
   determining a first torque ripple at a torque output of a target electrical machine via one of a direct measurement and a finite element analysis of the target electrical machine;
   upon determining that the first torque ripple exceeds a threshold, reproducing the torque output using on a first pair of gamma control sets provided to the target electrical machine, each gamma control in the first pair of gamma control sets being represented as a phasor at a fundamental frequency: $I\angle(\gamma\pm\Theta)$ at $f_o$, where I represents a current (amps), $\gamma$ represents a gamma angle (degrees), $\Theta$ represents an offset angle (degrees), $\gamma\pm\Theta$ represents a control angle (degrees), and $f_o$ represents a fundamental frequency (Hz) of the target electrical machine;
   determining a second torque ripple at the reproduced torque output via the one of the direct measurement and the finite element analysis of the target electrical machine;
   upon determining that the second torque ripple falls below the threshold, generating qualified gamma controls based on the gamma control sets, wherein the qualified gamma controls are a second pair of gamma control sets able to reproduce and maintain a torque output of the targeted electrical machine equal to the torque output generated using the first pair of gamma control sets, while producing a lower the torque ripple at the torque output;
   supplying the qualified gamma controls to the designated input windings of the stator core of the target electrical machine; and
   operating the target electrical machine using the qualified gamma controls.

2. The method of claim 1, further comprising:
   calibrating the qualified gamma controls based on an operating parameter, wherein the operating parameter includes a minimum value, a target value, or a maximum value of a magnetic flux linkage, an angular speed, a voltage usage, or a current usage.

3. The method of claim 1, wherein the threshold represents a peak-to-peak torque ripple target value that is determined based on safety or performance requirements of the target electrical machine.

4. The method of claim 1, wherein the pair of gamma control sets includes a first set of gamma controls and a second set of gamma controls that each represents a three-phase power signal.

5. The method of claim 4, wherein the first set of gamma controls and the second set of gamma controls each includes three gamma controls, wherein each of the three gamma controls represents a current and control angle at a fundamental frequency of the target electrical machine.

6. The method of claim 1, wherein the qualified gamma controls represent a given pair of gamma controls sets that reproduce the torque output, while reducing a torque ripple at the torque output.

7. The method of claim 1, wherein supplying the qualified gamma controls to the target electrical machine comprises configuring a controller to:
   identify a combination of the qualified gamma controls; and
   supply the combination to designated input stator windings of the target electrical machine.

8. A system, comprising:
   a processor; and
   memory or storage comprising an algorithm or computer instructions, which when executed by the processor, performs an operation comprising:
   determining a first torque ripple at a torque output of a target electrical machine via one of a direct measurement and a finite element analysis of the target electrical machine;
   upon determining that the first torque ripple exceeds a threshold, reproducing the torque output using a pair of gamma control sets provided to the target electrical machine, each gamma control in the first pair of gamma control sets being represented as a phasor at a fundamental frequency: $I\angle(\gamma\pm\Theta)$ at $f_o$, where I represents a current (amps), $\gamma$ represents a gamma angle (degrees), $\Theta$ represents an offset angle (degrees), $\gamma\pm\Theta$ represents a control angle (degrees), and $f_o$ represents a fundamental frequency (Hz) of the target electrical machine;

determining a second torque ripple at the reproduced torque output via the one of the direct measurement and the finite element analysis of the target electrical machine;

upon determining that the second torque ripple falls below the threshold, generating qualified gamma controls based on the gamma control sets, wherein the qualified gamma controls are a second pair of gamma control sets able to reproduce and maintain a torque output of the targeted electrical machine equal to the torque output generated using the first pair of gamma control sets, while producing a lower the torque ripple at the torque output;

supplying the qualified gamma controls to the designated input windings of the stator core of the target electrical machine; and operating the target electrical machine using the qualified gamma controls.

9. The system of claim 8, the operation further comprising:
calibrating the qualified gamma controls based on an operating parameter, wherein the operating parameter includes a minimum value, a target value, or a maximum value of a magnetic flux linkage, an angular speed, a voltage usage, or a current usage.

10. The system of claim 8, wherein the threshold represents a peak-to-peak torque ripple target value that is determined based on safety or performance requirements of the target electrical machine.

11. The system of claim 8, wherein the pair of gamma control sets includes a first set of gamma controls and a second set of gamma controls that each represents a three-phase power signal.

12. The system of claim 11, wherein the first set of gamma controls and the second set of gamma controls each includes three gamma controls, wherein each of the three gamma controls represents a current and control angle at a fundamental frequency of the target electrical machine.

13. The system of claim 8, wherein the qualified gamma controls represent a given pair of gamma controls sets that reproduce the torque output, while reducing a torque ripple at the torque output.

14. The system of claim 8, wherein supplying the qualified gamma controls to the target electrical machine comprises configuring a controller to:
identify a combination of the qualified gamma controls; and
supply the combination to designated input stator windings of the target electrical machine.

15. A computer-readable storage medium having a computer-readable program code embodied therewith, the computer-readable program code executable by one or more computer processors to perform an operation comprising:
determining a first torque ripple at a torque output of a target electrical machine via one of a direct measurement and a finite element analysis of the target electrical machine;
upon determining that the first torque ripple exceeds a threshold, reproducing the torque output using a pair of gamma control sets provided to the target electrical machine, each gamma control in the first pair of gamma control sets being represented as a phasor at a fundamental frequency: $I\angle(\gamma\pm\Theta)$ at $f_0$, where $I$ represents a current (amps), $\gamma$ represents a gamma angle (degrees), $\Theta$ represents an offset angle (degrees), $\gamma\pm\Theta$ represents a control angle (degrees), and $f_0$ represents a fundamental frequency (Hz) of the target electrical machine;

determining a second torque ripple at the reproduced torque output via the one of the direct measurement and the finite element analysis of the target electrical machine;

upon determining that the second torque ripple falls below the threshold, generating qualified gamma controls based on the gamma control sets, wherein the qualified gamma controls are a second pair of gamma control sets able to reproduce and maintain a torque output of the targeted electrical machine equal to the torque output generated using the first pair of gamma control sets, while producing a lower the torque ripple at the torque output;

supplying the qualified gamma controls to the designated input windings of the stator core of the target electrical machine; and operating the target electrical machine using the qualified gamma controls.

16. The computer-readable storage medium of claim 15, the operation further comprising:
calibrating the qualified gamma controls based on an operating parameter, wherein the operating parameter includes a minimum value, a target value, or a maximum value of a magnetic flux linkage, an angular speed, a voltage usage, or a current usage.

17. The computer-readable storage medium of claim 15, wherein the threshold represents a peak-to-peak torque ripple target value that is determined based on safety or performance requirements of the target electrical machine.

18. The computer-readable storage medium of claim 15, wherein the pair of gamma control sets includes a first set of gamma controls and a second set of gamma controls that each represents a three-phase power signal, wherein the first set of gamma controls and the second set of gamma controls each includes three gamma controls, and wherein each of the three gamma controls represents a current and control angle at a fundamental frequency of the target electrical machine.

19. The computer-readable storage medium of claim 15, wherein the qualified gamma controls represent a given pair of gamma controls sets that reproduce the torque output, while reducing a torque ripple at the torque output.

20. The computer-readable storage medium of claim 15, wherein supplying the qualified gamma controls to the target electrical machine comprises configuring a controller to:
identify a combination of the qualified gamma controls; and
supply the combination to designated input stator windings of the target electrical machine.

* * * * *